United States Patent

Kerr et al.

[15] 3,652,819

[45] Mar. 28, 1972

[54] SOLDERING APPARATUS WITH VARIABLE FEED

[72] Inventors: Archie F. Kerr, Noblesville; Karl R. Lagier, Indianapolis, both of Ind.

[73] Assignee: Western Electric Company, Incorporated, New York, N.Y.

[22] Filed: Jan. 7, 1971

[21] Appl. No.: 104,671

[52] U.S. Cl..............................219/85, 219/130, 226/113, 226/121, 228/41, 228/52, 314/97
[51] Int. Cl.................................................B23k 3/06
[58] Field of Search................219/85, 130; 228/11, 41, 52; 314/82, 92, 93, 59, 60, 97; 226/113, 121

[56] References Cited

UNITED STATES PATENTS

| | | | |
|---|---|---|---|
| 1,133,237 | 3/1915 | Ranney | 228/11 |
| 1,448,099 | 3/1923 | Whittall | 228/11 |
| 2,892,925 | 6/1959 | Butterfield | 219/127 |
| 2,950,381 | 8/1960 | Brennan et al | 219/127 |
| 3,391,844 | 7/1968 | Bell et al | 228/41 |
| 3,521,801 | 7/1970 | Clupper | 226/121 |

FOREIGN PATENTS OR APPLICATIONS 1,549,191  11/1968  France.................................219/127

*Primary Examiner*—J. V. Truhe
*Assistant Examiner*—L. A. Schutzman
*Attorney*—W. M. Kain, R. P. Miller and A. C. Schwarz, Jr.

[57] ABSTRACT

A soldering apparatus comprising automated mechanisms for positioning solder heating electrodes in contacting relationship with successively aligned areas of piece parts to be soldered, and a solder feed mechanism including a resilient, energy storing portion for advancing solder, in wire form, to the heated areas at a rate which may vary so as to continuously match the melt-off rate of the solder.

15 Claims, 7 Drawing Figures

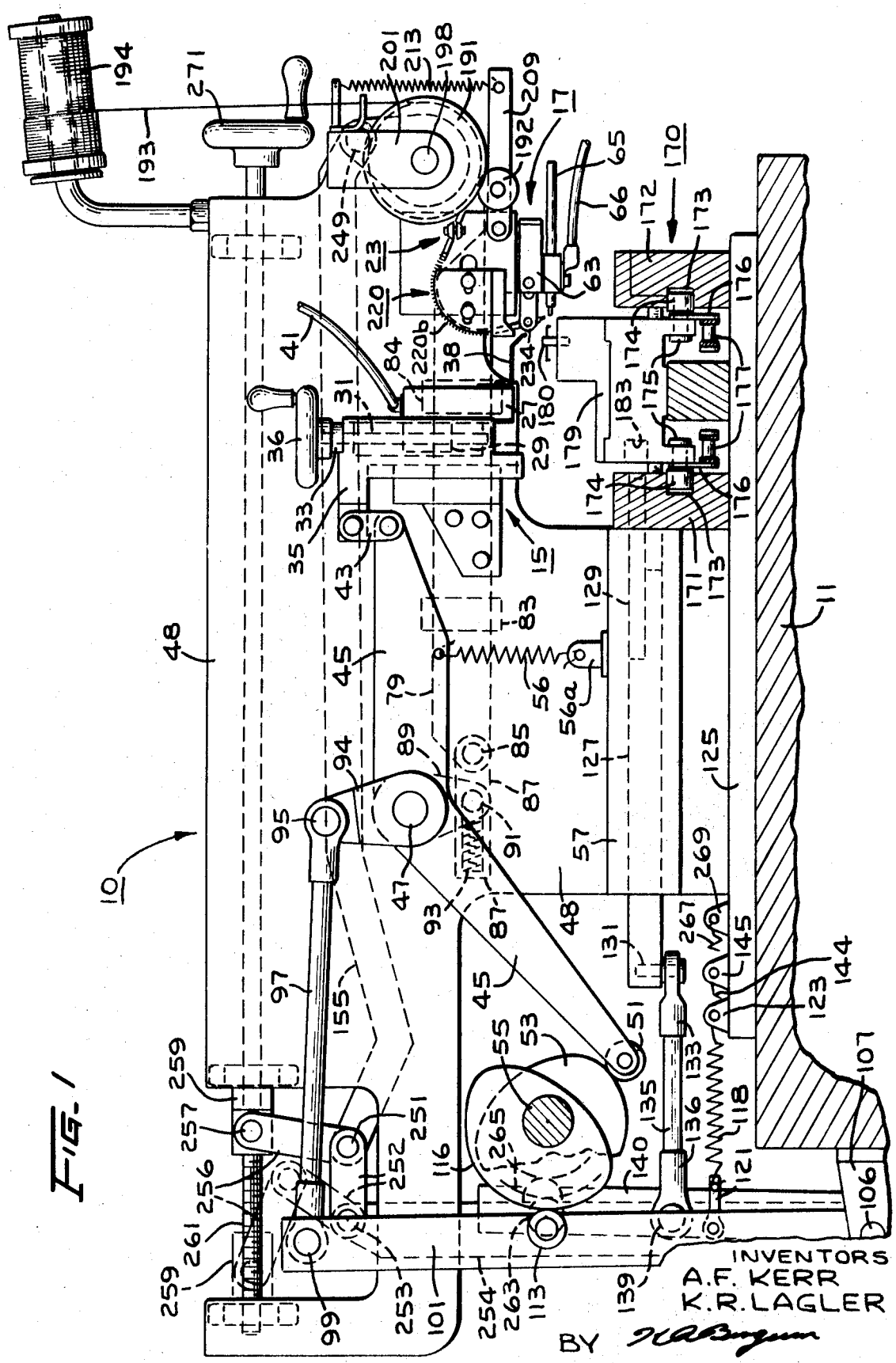

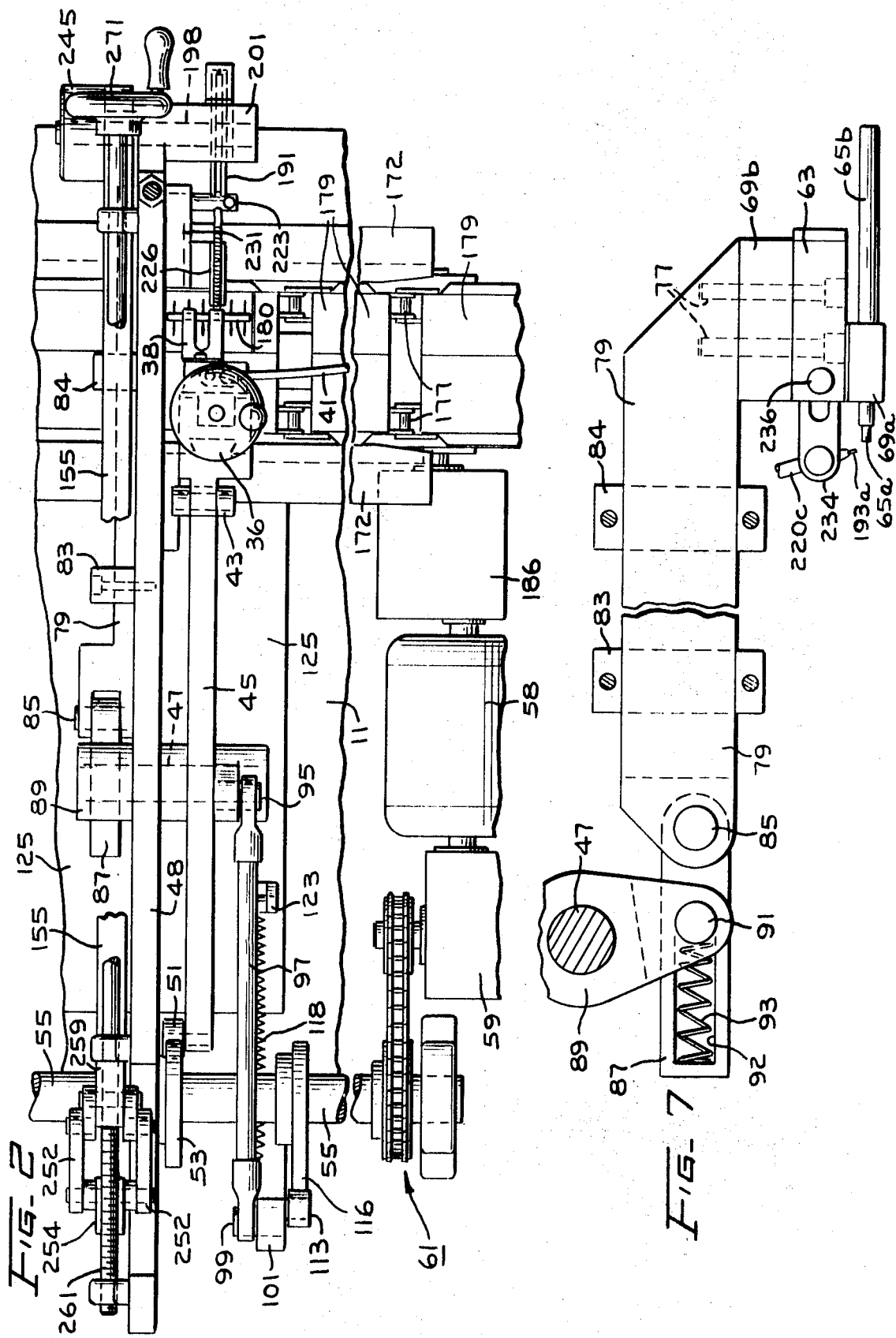

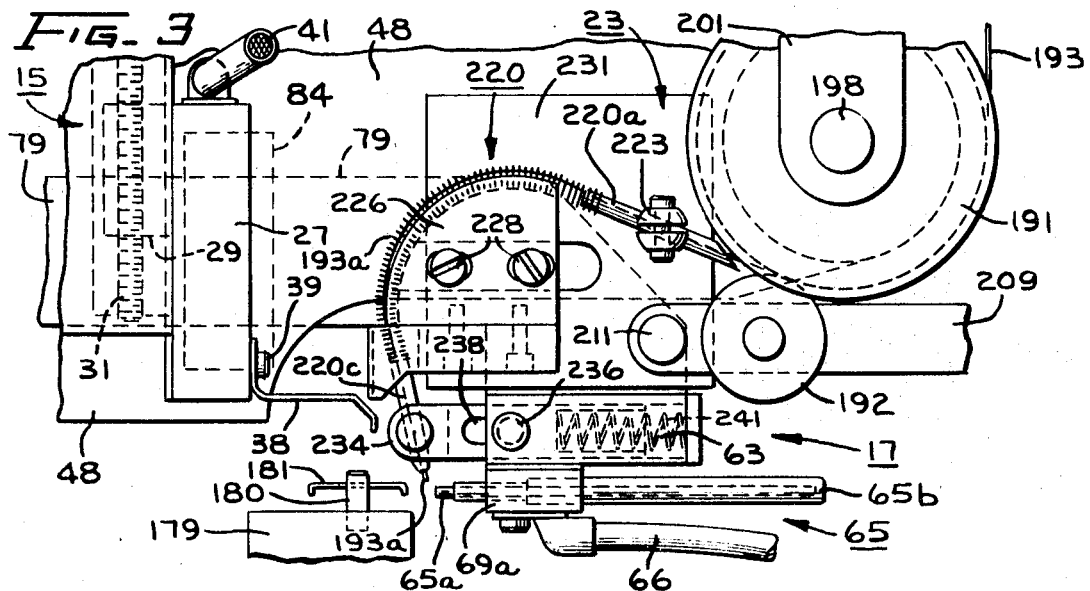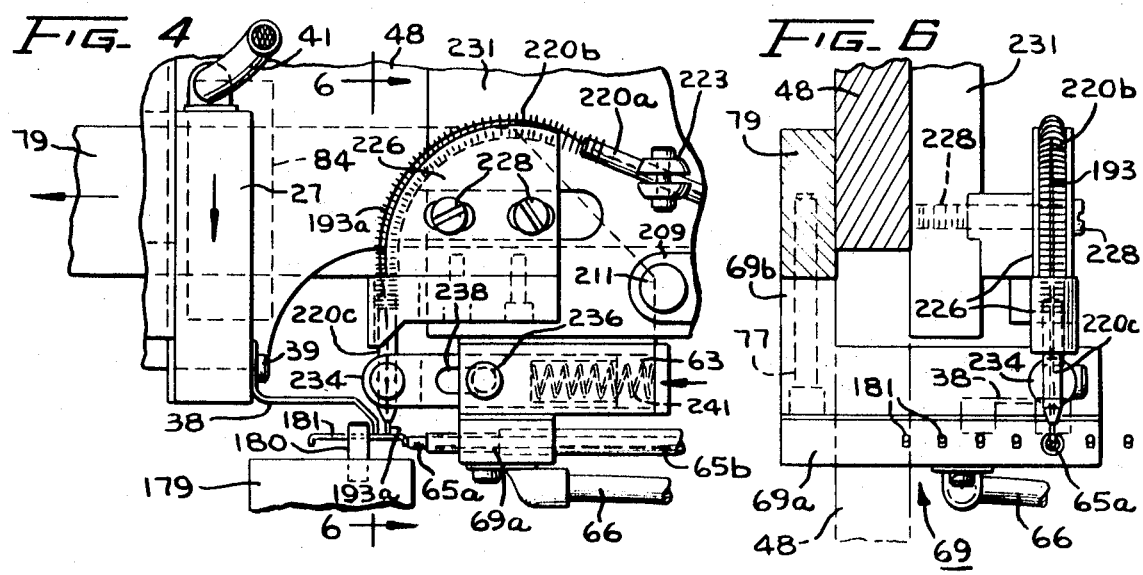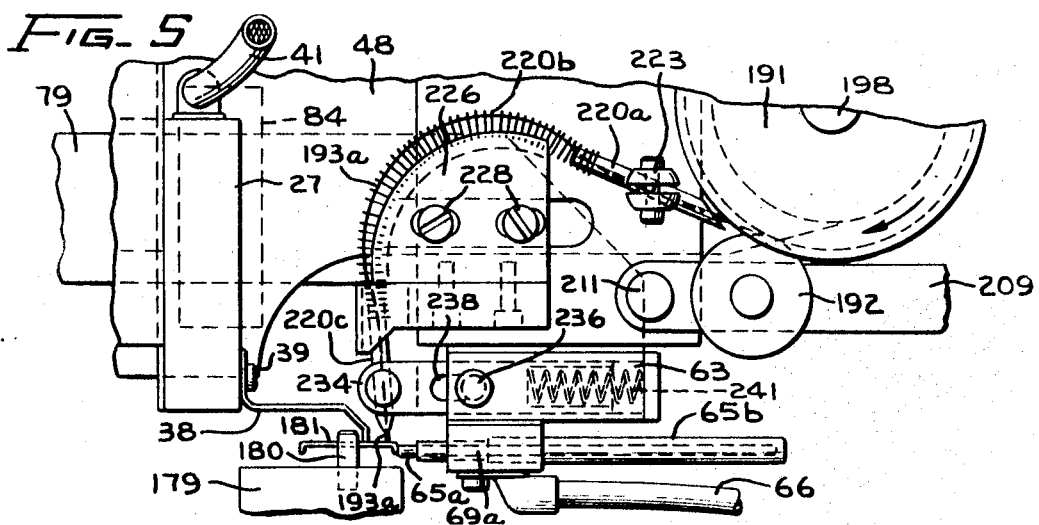

SOLDERING APPARATUS WITH VARIABLE FEED

BACKGROUND OF THE INVENTION

1. Field of the Invention

This invention relates to soldering apparatus and, more particularly, to apparatus for soldering electrical terminals on an automated basis.

2. Description of the Prior Art

In soldering apparatus employed heretofore, a nominal length of solder, in wire form, has normally been advanced to the soldering area by a positive drive mechanism comprising either a hitch feed or an intermittently driven pair of mating friction rollers. Unfortunately, not only does the amount of solder required for different soldering applications vary appreciably, but even with respect to a specific application there is no exact length of solder that can be chosen to satisfy each and every soldering cycle. This results because of a number of variable soldering parameters which must be taken into account simultaneously. For example, there are often slight variations in the cross-sectional areas or thicknesses of one or more of the mating parts to be soldered together, or minute impurities imbedded in one or more of the parts, not to mention variations in the composition and cross-sectional area of the solder. The attainment of consistent electrode contact with the piece part has also presented problems heretofore in achieving uniform heating.

As such, the most that could be hoped for heretofore in connection with automated solder feed mechanisms was to utilize a precision, positive feed mechanism which would consistently advance a precise, nominal length of solder during each soldering cycle, with the particular length being based most often on trial and error, and less often on some empirical formula.

In view of the foregoing, it is seen that it would be very desirable to have a solder feed mechanism which would advance solder at a rate that would vary in direct relationship to the melt-off thereof, rather than simply be dependent on a mechanically controlled physical displacement of solder having no direct dependency on any factor or parameter involved in a given soldering operation.

SUMMARY OF THE INVENTION

An object of the present invention is to provide a new and improved automated soldering apparatus for positioning heated electrodes in contacting relationship with successively aligned piece parts to be soldered, and to control the advance of solder thereto in a manner which is dependent solely on the rate of melt-off which occurs during each successive soldering operation.

It is another object of this invention to provide a new and improved soldering apparatus wherein the solder feed mechanism includes a resilient, energy storing portion which is capable of advancing solder at a rate which exactly matches the melt-off rate thereof, such control over the advancement of solder obviating the need for both precision, positive solder feed mechanisms and for the need of establishing a fixed length of solder advancement based on some arbitrary or nominal value determined either empirically or by trial and error.

In accordance with one illustrative embodiment of the invention, the apparatus comprises cam-actuated solder heating electrode and article positioning mechanisms and a unique solder feed mechanism, including a resilient energy storing feed tube portion, which allows the solder fed therethrough to be advanced at a rate which may vary so as to match continuously the actual melt-off rate of the solder during each particular soldering operation.

Considered more specifically, the solder, preferably in wire form, is fed from a supply spool through intermittently operated drive rollers and then into a feed tube, an intermediate, arcuate portion of which is formed of a resilient material, such as a coil of spring steel in one illustrative embodiment. At the start of a given soldering operation, a piece part is initially aligned with the feed tube and the extremity of the solder is brought into contact with the piece part, such as against an electrical terminal on a terminal block, for example. With the terminating end of the solder so restricted, the advancement of an additional non-critical length thereof into the feed tube causes the resilient coil spring portion thereof to elongate slightly and thereby form a larger arc. Thereafter, as the heating electrode or electrodes are brought into contact with the terminal and the solder begins to melt off, the stored tensional energy in the expanded resilient coil spring is employed to advance the solder continuously, but only as rapidly as melt-off actually occurs during each particular soldering operation. Reference to an electrode herein is intended to encompass heating elements in general, including those of the indirectly heated types.

This unique solder feed technique thus advantageously obviates the need for precision drive mechanisms for periodically advancing precise lengths of solder which, at most, can only be equatable with a nominal melt-off rate because of a number of variables of the type mentioned hereinabove which are involved in every soldering operation.

BRIEF DESCRIPTION OF THE DRAWING

FIG. 1 is a front elevational view of the composite soldering apparatus in accordance with one preferred illustrative embodiment of the present invention;

FIG. 2 is a plan view of the composite soldering apparatus;

FIGS. 3–5 are enlarged, partial front elevational views, particularly of the solder feed mechanism incorporated in the soldering apparatus, the three respective views illustrating the various stages of advancement of the solder electrodes and solder during a typical soldering operation;

FIG. 6 is a partial, cross-sectional view of the solder feed mechanism taken along the line 5—5 of FIG. 4, and FIG. 7 is an enlarged, partial front elevational view of the second solder electrode mechanism, showing in greater detail the cross-slide apparatus associated therewith.

DETAILED DESCRIPTION

In accordance with the principles of the present invention, and with specific reference to FIG. 1, a composite soldering apparatus identified generally by the reference numeral 10 is supported on a stationary base 11 and basically comprises the following cam-actuated mechanism: (1) a first solder electrode advancing mechanism 15, (2) a second solder electrode advancing mechanism 17, (3) a piecepart conveyor locking mechanism 21 and (4) a wire solder feeding mechanism 23.

The first solder electrode mechanism 15 comprises a first adjustable electrode holder 27 (best seen in FIGS. 1 and 3–5) secured to a threaded nut 29 which mutually engages a threaded rod 31. The rod is rotatably mounted at its upper end through a bushing 33 to a vertically movable slide member 35. Also affixed to the top end of the threaded rod 31 is a rotatable hand crank 36 for adjusting the first electrode holder 27 to the desired elevation.

A first electrode 38 in the form of a bifurcated steel spring (best seen in FIG. 2) is secured by suitable means, such as a threaded fastener 39, to the lower end of the electrode holder 27. The latter provides a conductive path from the electrode 38 to an electrical supply cable 41 secured to the upper end of the electrode holder 27. The vertical slide member 35 associated with the first soldering electrode 38 is connected through a linkage 43 to one extremity of a bell crank 45. The intermediate apex of the bell crank is mounted for pivotal movement about a shaft 47 secured to a stationary frame member 48, with the lower left extremity of the bell crank (as viewed in FIG. 1) having a rotatable cam follower 51 secured thereto. This cam follower is continuously maintained in biasing contact with a cam 53, which is secured to a rotatable cam shaft 55, by means of a coil spring 56 attached at one end to the bell crank 45 and at the other end to a bracket 56a secured to a channel defining support member 57. A power source (see FIG. 2), comprising a motor 58, a gear reducer 59 and a sprocket and chain drive assembly 61, drives the rotatable cam shaft 55.

From the foregoing description of the various main members comprising the first solder electrode mechanism 15, and with particular reference to FIG. 1, it is readily seen that the rotatable movement of the asymmetrical cam 53 causes the bell crank 45, through the cam follower 51, to oscillate about the support shaft 47 and, thereby, cause the end of the bell crank 45 connected to the linkage 43 to move back and forth in an essentially vertical direction. This movement, in turn, through the linkage 43 causes the first electrode slide member 35, together with the associated electrode holder 27 and electrode 38, to move in a desired vertical reciprocal movement during each operating cycle.

The second solder electrode mechanism 17 comprises an electrode holder 63 (best seen in FIGS. 3–5) which supports an electrode 65 in a horizontal position. The electrode 65 in one preferred illustrative embodiment comprises a conventional carbon resistance rod 65a mounted within a holder 65b. In such resistance heating, the conductive area of the piece part to be soldered is relied upon to provide continuity between the electrodes 38 and 65. An electrical supply cable 66, together with cable 41, completes an electrical circuit to a conventional power supply (not shown). It should be understood, of course, that other types of heating, such as localized radiant energy heating utilizing filament type heaters, as well as electron beams and infrared heating systems, may be employed to heat the piece part and melt the solder in accordance with the principles of the present invention.

The electrode holder 63, as best seen in FIGS. 6 and 7, is electrically isolated from but affixed to an L-shaped bracket 69 (best seen in FIG. 6) comprising a base portion 69a and a vertical portion 69b. The vertically extending portion 69a of the L-shaped bracket is secured through suitable fastening elements 77 to a cross-slide member 79 which is mounted for slidable movement relative to the stationary frame member 48 (best seen in FIG. 6). The member 79 is supported by and slidable laterally relative to two channel defining support brackets 83 and 84 (best seen in FIGS. 1 and 7) which are secured to the stationary frame member 48.

A pin 85 affixed to the extreme left end of the cross slide member 79 is rotatably secured to one end of a spring biased linkage 87 (best seen in FIGS. 2 and 7). A crank arm 89, secured at one end to the support shaft 47, has a stationary pin 91 secured to the opposite end thereof, which pin extends into a keying slot 92 of the linkage 87. A biasing spring 93 is axially positioned within a bore of the linkage 87 so as to normally exert a compressive force between the left end of the linkage and the pin 91 affixed to the crank arm 89. This allows movement of the pin 91 relative to the cross-slide member 79 should an obstruction prevent lateral movement of the latter during a typical operating cycle.

Also affixed to the rotatable support shaft 47 is a crank arm 94 (best seen in FIG. 1) which, through a pin 95, connects a linkage arm 97, through a pin 99, to the upper end of an oscillatory lever 101.

The lower end of the lever 101 is pivotally connected through a pin 106, extending through bracket 107, to the member 11. A cam follower 113 is rotatably mounted on an intermediate portion of the oscillatory lever 101 and is spring biased against an asymmetrical cam 116 secured to the cam shaft 55. Biasing force is exerted between the cam follower 113 and the cam 116 by means of a coil spring 118 affixed at one end to the lever 101 through a bracket 121 and at the other end to a bracket 123 which, in turn, is attached to an auxiliary support plate 125 attached to the lower main base plate 11 of the apparatus.

As thus described, the second solder electrode mechanism 17 operates in the following manner. Rotation of the power driven cam shaft 55 causes the asymmetrical cam 116 to rotate and, through contact with the cam follower 113, causes the lever 101 to pivot back and forth in an oscillatory manner. As such, the essentially reciprocal lateral movement of the linkage arm 97 causes the rotatable support shaft 47, which is rigidly secured to the crank arm 94, to angularly oscillate back and forth. As the crank arm 89 is also rigidly affixed to the rotatable support shaft 47, the pin 91 secured thereto, and which extends through the keying slot 92 of the linkage 87, moves the latter in a reciprocal manner in a lateral direction. Inasmuch as the pin 85 couples the cross slide member 79 to the linkage 87, member 79 likewise is reciprocally moved laterally, the distance normally being defined by the lateral displacement of the pin 91 secured to the crank arm 89.

Accordingly, not only the cross-slide member 79, but the L-shaped bracket 69, together with the second electrode holder 63 and electrode 65, all move as a composite cross slide mechanism laterally back and forth during a typical soldering operation. While this movement will be described in further detail hereinafter in connection with the solder feed mechanism 23, reference is nevertheless generally made at this point to FIGS. 3–5 which illustrate in greater detail the position of the second electrode 65 at various stages of a typical soldering cycle in accordance with the principles of the present invention.

The piece part conveyor locking mechanism 21 basically comprises a longitudinally movable cross slide member 127 having a locking pin 129 secured to one end thereof, with the other end of the cross-slide member 127 being connected through a pin 131 to a bracket 133 affixed to a linkage arm 135. The cross-slide member 127 is supported for slidable movement within a channel formed in support member 128 which, in turn, is secured through an auxiliary support plate 57 to the support plate 125.

The left end of the linkage arm 135 is connected through an affixed bracket 136 and a pin 139 to a second oscillatory lever 140. The lower end of lever 140, as in the case of the oscillatory lever 101, is pivoted about a pin (not shown) which extends through the bracket 107, the latter being secured to the lower main support base 11 of the apparatus.

A rotatable cam follower 143 is mounted on an intermediate portion of the oscillatory lever 140 and is maintained in spring biased contacting relationship with the asymmetrical cam 143, secured to the cam shaft 55, by means of a spring 144. The spring is affixed at one end to the lever 140 (through a bracket not seen), and at the other end to a bracket 145 secured to the support plate 125.

Considering now in greater detail the relationship of the piece part conveyor locking mechanism 21 with an associated conveyor system designated generally by the reference numeral 170, the locking pin 129 is aligned so as to extend through an aperture in the nearest of two spaced guide rails 171, 172 of the conveyor system. Each of the guide rails has an undercut, longitudinally extending groove 173 formed along the inner surface thereof. Each groove accommodates a plurality of rollers 174 which are secured through pins 175 to brackets 176 which are, in turn, connected through pins 177 to links 178 (FIG. 2) forming a link chain of the conveyor system. It is to be understood, of course, that a separate link chain is associated with each of the guide rails 171, 172, and that together they form a part of a composite chain conveyor.

Mounted in a spaced array along the chain conveyor are a series of piece part supporting nests 179. Each nest has a lower bifurcated bottom portion and an upper portion adapted to support a piece part designated generally by the reference numeral 180. As shown only in simplified form in connection with one illustrative application, the piece part comprises a terminal block for a telephone receiver unit having a plurality of electrical terminals 181 (see FIGS. 2 and 6), which are to be soldered, secured thereto. It is to be understood, of course, that the soldering apparatus in accordance with the principles of the present invention has application in connection with the soldering of piece parts in general and, as such, they may be of diverse types and configurations. The lower bifurcated leg portions of each nest are secured to the aligned rollers 174 confined within the undercut grooves 173 by means of the pins 175.

Each nest has one (or more) recessed areas or cavities 181 formed in the sidewall thereof in closest proximity to and in alignment with the locking pin 129. As such, each time a nest is advanced to the soldering station, the camactuated locking pin 129 extends into a particular recess 183 of a given nest so as to accurately and rigidly position the nest relative to the solder electrodes at the soldering station.

In the illustrative embodiment, and as best seen in FIG. 2, intermittent advancement of the conveyor system is accomplished by power supplied from the motor 58, through a gear reducer 186, to a sprocket (not shown) positioned in engaging relationship with the link chain in closest proximity to the gear reducer. The intercoupling between the nests and the two link chains effects driving force to the link chain not coupled to the sprocket.

The wire solder feeding mechanism as embodied herein and previously identified and designated generally by the reference numeral 23, includes an intermittently operated drive roller 191 and a frictionally engaging idler roller 192 for feeding predetermined lengths of solder, in wire form, therebetween from a rotatable supply spool 194. Drive roller 191 is secured to a shaft 198 which, in turn, is journaled in a stationary support member 201. Member 201, as best seen in FIG. 2, is secured to the stationary frame member 48. The intermittent positive driving of roller 191 will be described in greater detail hereinbelow. Idler roller 192 is mounted for rotational movement on a lever 209 which is pivotally secured at one end to the frame 48 through an auxiliary member 231 by means of a pin 211, and is spring-biased upwardly at the opposite end by means of a coil spring 213 connected between the lever 209 and the support 201 through a bracket 215. The spring 213 thus produces the necessary frictional force required against the solder by the feed rollers so as to effect the desired periodic advancement of the solder.

Upon being fed through the feed rollers 191, 192, the solder is advanced through a feed tube designated generally by the numeral 220, comprising a stationary entrance section 220*a*, an intermediate, arcuate section 220*b*, which is formed of resilient material, and a terminating end section 220*c* which terminates in proximity to the second electrode 65 of the soldering apparatus. The feed tube sections 220*a* and 220*c* are preferably made of rigid material and are formed as straight sections, although this is not a critical requirement.

The beginning stationary feed tube section 220*a* is attached to the frame member 48 by means of a suitable fastening element 223 (best seen in FIGS. 3–5). This stationary feed tube section is positioned so as to have one end which terminates in close proximity to the mating area of the feed rollers on the side from which the solder exits.

The arcuate, resilient intermediate feed tube section 220*b*, in one preferred illustrative embodiment of the invention, comprises a helical coil spring which is chosen to have sufficient resiliency so as to become slightly elongated or expanded, thereby forming a larger arc, whenever a length of solder, which need not have a precise or critical length, is fed therein while the terminating end of the solder is prevented from advancing because of contact with the piece part. Before being elongated, a major length of the feed tube section 220*b* is supported within an arcuate, peripheral groove of an adjustable support plate 226 (best seen in FIGS. 3–6). The support plate is secured by means of threaded fasteners 228 to an auxiliary support member 231 which, in turn, is secured to the stationary frame member 48, as best seen in FIG. 6. The threaded fasteners 228 extend through slotted openings in the feed tube support plate 226 so as to allow lateral adjustment of the plate relative to the stationary frame member 48.

It should be understood, of course, that while an intermediate feed tube section 220*b* comprising a helical coil spring has been illustrated in the preferred embodiment, this configuration is not necessarily required in accordance with the principles of the present invention. For example, the arcuate feed tube section could also be made out of resilient materials other than metal or plastic, such as rubber. In the latter case, the resilient feed tube section could actually comprise a continuous hollow tube. Conversely, the arcuate feed tube section need not even exhibit an inherent resiliency. More specifically, a nonresilient arcuate feed tube section could be allowed to become displaced from the peripheral groove in member 226, for example, without actually having to expand. Such displacement could then be utilized to cause an external resilient energy source biased thereagainst, such as a spring, to temporarily acquire a spring biased energy state. This externally stored energy could thereafter be utilized to force the nonresilient arcuate feed tube section back toward its original position within the curve of the member 226 at a rate commensurate with the rate of solder melt-off during a soldering operation.

The rigid feed tube terminating end section 220*c* is secured to a spring-biased member 234 which is supported for slidable movement within a bore of the electrode holder 63 (see FIGS. 4 and 6). A pin 236, secured to the electrode holder 63, extends through a keying slot 238 of the member 234 and, thereby, restricts the lateral movement thereof. A spring 241, mounted within a bore of electrode holder 63, normally biases the feed tube support member 234 to the left, as viewed in FIGS. 3–5. However, should an unintended obstruction prevent the terminating end of the solder 193*a* to contact the aligned piece part at the desired point thereon, the spring 241 will allow the feed tube support member 234 to overcome the normal force of the spring and thereby move to the right by the distance defined by the length of slot 238.

The larger of the two feed rollers, namely 191, is intermittently actuated to rotate in only a clockwise direction through a one way clutch mechanism 245 (see FIG. 2) secured to the stationary support member 201 and coupled to the shaft 198. The clutch is shown only generally in FIG. 2. A crank arm 247 is also coupled to the clutch and is capable of rotating counterclockwise relative to the shaft 198 and feed roller 191 secured thereto. The crank arm 247 is connected near its upper end through a pin 249 to the bell crank 155. As best seen in FIG. 1, the opposite or left end of the bell crank 155 is connected through a pin 251, a linkage 252, and a pin 253 to the upper end of a third oscillatory lever 254 and through a linkage 256 and a pin 257 to a nut 259 threaded on a rod 261.

The lower end of lever 254, as in the case with levers 101 and 140, is pivotally connected through a pin (not shown), which extends through the bracket 107, to the base member 11. A cam follower 263 is rotatably mounted on an intermediate portion of the oscillatory lever 254 and is spring biased against an asymmetrical cam 265 secured to the cam shaft 55. Biasing force is exerted between the cam follower 263 and the cam 265 by means of a coil spring 267 (only partially shown in FIG. 1) which is affixed at one end to the lever 254 through a bracket (not shown) and at the other end to a bracket 269 which, in turn, is secured to the auxiliary support plate 125.

As can readily be seen by the profile of the asymmetrical cam 265, oscillatory movement is imparted to the lever 254 through the cam follower 263 and this movement, in turn, causes the bell crank 155, through common linkage 252 to oscillate the crank arm 247 associated with the one way clutch 245 back and forth. This, of course, effects the desired intermittent, ratchet imparted rotation of the drive wheel 191 in a clockwise direction.

While the length of solder which should be advanced into the resilient feed tube passage is not critical in accordance with the principles of the present invention, it nevertheless may vary considerably between different soldering applications. Accordingly, an adjustable but non-critical positive solder feed mechanism is incorporated in the composite apparatus. More specifically, a hand wheel 271 is attached to the right end of the threaded rod 261. Along the opposite end of the threaded rod 261 is the aforementioned mutually engaging threaded nut 259. This nut as also previously mentioned is coupled to one end of the bell crank 155 through the common linkage 256.

When the threaded nut 259 is in the position illustrated in FIG. 1, an essentially horizontal reciprocal motion is imparted to the bell crank 155 through the oscillatory movement of the lever 254. As previously mentioned, it is this movement which imparts oscillatory movement to the crank arm 247 coupled to the one way clutch 245.

In contrast to the maximum advancement of solder which is effected when the threaded nut 259 is positioned as indicated in FIG. 1, if it is moved to the position shown in phantom (through rotation of the rod 261), then there is no advancement of solder. More specifically, with the threaded nut in the position shown in phantom, the linkage 256 will pull linkage 252 and the bell crank 155 into relative positions whereby a resultant oscillatory movement is imparted to only the linkage 252, the bell crank 155 remaining stationary. As such, the right end of the bell crank connected to the crank arm 247 will impart no oscillatory or back and forth movement to the latter and, thus, the drive wheel 191 will not be intermittently rotated so as to advance any solder between the feed rollers. Of course, it becomes readily apparent that any intermediate position of the threaded nut 259 along the threaded rod 261 will result in the advancement of a length of solder which is directly proportional to the distance of the threaded nut from the extreme left end of the threaded rod 261.

The operation of the solder feed mechanism 23 can perhaps best be described with particular reference to FIGS. 3–5, which illustrate in detail the positions of the feed tube 220 and the solder electrodes 38 and 65 relative to each other at three progressive stages during a typical soldering cycle. More specifically, FIG. 3 shows a typical position of the resilient feed tube section 220b after a soldering operation has been performed on a given piece part, and after the first and second electrode mechanisms 17 and 21, respectively, have been retracted therefrom. At that time, the resilient feed tube section 220b is normally supported by and confined within the arcuate peripheral groove of the feed tube support plate 226.

Upon the first and second electrodes 38 and 65 being moved toward and finally being brought into contact with a newly aligned piece part 180, as depicted in FIG. 4, the terminating end of the solder 193a is also brought into contact with the area of the piece part to be soldered. While in this position, the feed rollers 191 and 192 are momentarily operated so as to advance a predetermined length of wire solder 193 into the feed tube 220.

Advantageously, and in accordance with the principles of the present invention, the length of solder periodically advanced by the intermittent operation of the feed rollers is not in any way intended to actually match the melt-off rate during a given soldering operation. Rather, the length of solder advanced need only be sufficient to elongate the resilient feed tube section 220b to such an extent, that the tensional energy stored therein will insure that an adequate supply of solder will be available to cover a fairly wide range of melt-off rates normally experienced in a typical run of soldering operations in a mass production application.

With an electrical connection being made between the electrodes 38 and 65 through a metallic terminal (or terminals) 181 of the piece part (see FIGS. 2 and 6), the solder and terminal will be very rapidly resistance heated to a temperature sufficient to melt the solder. At that point the tensional energy stored in the expanded resilient feed tube section 220b is relied upon exclusively to cause the terminating end of the solder 193a to be advanced against the terminal only as rapidly as melt-off actually occurs. Considered another way, the resilient feed tube is capable of sensing and responding to solder melt-off rates which may be either variable or uniform in a particular soldering operation.

In summary, the composite soldering apparatus comprises cam-actuated solder electrode mechanisms, a cam-actuated conveyor locking mechanism and a solder feed mechanism which incorporates a resilient feed tube section wherein tensional energy intermittently stored therein is relied upon, independently of an associated non-critical positive feed portion of the solder feed mechanism, to advance the terminating end of the solder against a piece part surface area to be soldered at a rate which is solely dependent upon and determined only by the melt-off rate of the solder during each and every soldering cycle.

As such, the present novel technique of feeding solder obviates the need for any type of precision drive mechanism for advancing a precise length of solder during each soldering cycle. Concomitant advantages of the unique solder feed mechanism embodied in accordance with the principles of the present invention are that it is reliable, inexpensive, of simplified construction and has universal application in any one of a number of different types of soldering apparatus in addition to the one illustrated herein.

What is claimed is:

1. In a soldering apparatus for making solder connections on piece parts:
    means for positioning at least one solder heating element at least in close proximity to an area of a piece part to be soldered, and
    a solder feed mechanism including solder feed path means having at least an arcuately deflectable portion for successively receiving predetermined lengths of solder fed therein, said feed path means being capable of biasing against and imparting an axially directed force on the solder confined therealong in response to each predetermined length of solder fed therein, said force causing arcuate deflection of the axis of said deflectable portion of said solder feed path means in a direction to cause advancement of the terminating end of the solder against the connection area of the piece part aligned therewith at a rate which continuously matches the melt-off rate of the solder when heated to a molten state during each soldering operation.

2. In a soldering apparatus in accordance with claim 1, said solder feed path means of the solder feed mechanism includes a feed tube having at least an intermediate, arcuate section composed of an expandable material exhibiting sufficient resiliency so as to be capable of imparting a tensional, spring-biased force against and advancing the terminating end of said solder at the melt-off rate thereof, said advancement occurring each time after a predetermined length of solder has been fed into said feed tube section while the terminating end of said unheated solder is temporarily restricted from advancement by the piece part aligned therewith.

3. In a soldering apparatus in accordance with claim 2, said intermediate, arcuate feed tube section comprising a resilient helical coil spring.

4. In a soldering apparatus for making solder connections successively on piece parts comprising at least one solder heating element which is brought into at least close proximity with each piece part solder connection area when positioned in alignment therewith:
    means for intermittently drawing a predetermined but non-critical length of solder from a supply thereof, and
    means for temporarily storing the intermittently drawn solder, said last-mentioned means including a solder feed path capable of acquiring a spring-biased energy state through arcuate deflection of the axis thereof in response to a predetermined length of solder being fed through said means for storing solder, the energy acquired by said solder feed path subsequently imparting a spring-biased force against and advancing at least a portion of each stored length of solder at a rate which may vary so as to continuously match the melt-off rate of the solder during each soldering operation.

5. In a soldering apparatus in accordance with claim 4, said solder feed path comprising a resilient, arcuate feed tube section which is capable of expanding in axial length, in response to a predetermined length of solder being fed therein, by an amount sufficient to establish a magnitude of tensional spring-biased energy therein which is capable of imparting a force against and advancing the terminating end of said solder against the piece part in the connection area at the melt-off rate of the solder when heated to a molten state.

6. In a soldering apparatus in accordance with claim 5, said resilient, arcuate feed tube section comprising a helical coil spring.

7. In a soldering apparatus for making solder connections on a succession of piece parts advanced to a soldering station on an automated basis:
   means including at least one solder heating element operably movable into at least close proximity with each solder connection area of successive piece parts advanced into alignment therewith;
   means for intermittently drawing a predetermined but non-critical length of solder from a supply thereof each time a piece part solder connection area is advanced into alignment with the solder heating element;
   means for temporarily storing the intermittently drawn solder, said last-mentioned means including a solder feed path capable of acquiring a spring-biased energy state through arcuate deflection of the axis thereof in response to a predetermined length of solder being fed through said means for storing solder, the energy acquired by said solder feed path subsequently imparting a spring-biased force against and subsequently advancing at least a portion of each stored length of solder at a rate which may vary so as to continuously match the melt-off rate of the terminating end of the solder when heated to a molten state during each soldering operation.

8. In a soldering apparatus in accordance with claim 7, said solder feed path including a resilient, arcuate feed tube section in the form of a helical coil spring, said coil spring being capable of expanding in axial length by an amount sufficient to establish a magnitude of tensional spring-biased energy therein which will impart a force against and advance the terminating end of said solder against the piece part in the connection area at the melt-off rate thereof, this occurring each time after a predetermined length of solder is fed into said feed path while an unheated terminating end of said solder is temporarily restricted from movement by an aligned piece part positioned in contacting relationship therewith.

9. In a soldering apparatus in accordance with claim 7, said apparatus further comprising:
   piece part conveyor means operated in synchronism with said means for intermittently drawing a predetermined length of solder for accurately and successively positioning the solder connection areas of the piece parts in alignment with said solder heating element and the terminating end of said solder.

10. A soldering apparatus for making solder connections on piece parts successively fed to a soldering station associated with said apparatus, said apparatus comprising:
    first means for successively advancing piece parts into a desired position at a soldering station;
    second means including at least one heating element for successively heating the solder connection areas of piece parts successively advanced to the soldering station, and
    third means for temporarily storing a predetermined but non-critical length of solder fed therein and for establishing a spring-biased condition through arcuate deflection of the axis of at least a portion of said third means while the terminating end of the solder is temporarily restricted from movement by contact with an aligned piece part, the spring-biased energy temporarily stored in said third means subsequently imparting a force against and advancing said solder confined therewithin from the end of said feed path at a rate which may vary so as to match the melt-off rate thereof during a soldering operation.

11. A soldering apparatus in accordance with claim 10 wherein said third means includes a feed tube having at least an intermediate arcuate, resilient section comprising a coil spring.

12. A soldering apparatus in accordance with claim 10 wherein said second means includes two solder heating elements in the form of electrodes connected to a current source and being operable to move into contact with at least a conductive portion of a given piece part solder connection area aligned therewith so as to complete a current path between said electrodes and thereby resistance heat said solder connection area.

13. A soldering apparatus including at least one solder heating element movable into a position in at least close proximity to a solder connection area of a piece part positioned in alignment therewith at a soldering station, said apparatus further comprising:
    means for intermittently drawing a predetermined but non-critical length of solder in wire form from a supply thereof, and
    means for directing said drawn length of solder toward and into contacting relationship with the solder connection area of said piece part, said means including an arcuate feed tube portion which exhibits sufficient resiliency so as to be axially expanded and arcuately deflected whenever said predetermined length of solder has been fed through said feed tube portion while the terminating end of said solder is temporarily restricted from advancement by contact with a piece part prior to a solder connection being made thereon, said resilient feed tube portion thereby being elongated slightly so as to form a larger arc, with the resultant stored tensional energy from the arcuate deflection of said feed tube portion thereafter being utilized to advance the solder only as rapidly as melt-off occurs at the terminating end thereof.

14. A soldering apparatus in accordance with claim 13 wherein said arcuate feed tube portion includes at least an intermediate section comprising a resilient helical coil spring through which the solder is fed.

15. A soldering apparatus in accordance with claim 13 further comprising:
    conveyor means operated in synchronous relationship with said means for intermittently drawing solder for successively advancing piece parts into alignment with the solder heating element at the solder station.

* * * * *